(12) United States Patent
Schierl et al.

(10) Patent No.: US 12,304,125 B2
(45) Date of Patent: May 20, 2025

(54) PLASTICIZING UNIT

(71) Applicant: KRAUSSMAFFEI TECHNOLOGIES GMBH, Munich (DE)

(72) Inventors: Stefan Schierl, Germering (DE); Andreas Bierbaumer, Prutting (DE); Thomas Drogi, Altdorf / Eugenbach (DE); Martin Würtele, Friedberg (DE); Lazlo Giesgen, Aachen (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 142 days.

(21) Appl. No.: 17/996,368

(22) PCT Filed: Apr. 27, 2021

(86) PCT No.: PCT/EP2021/060898
§ 371 (c)(1),
(2) Date: Oct. 17, 2022

(87) PCT Pub. No.: WO2021/219586
PCT Pub. Date: Nov. 4, 2021

(65) Prior Publication Data
US 2023/0302699 A1    Sep. 28, 2023

(30) Foreign Application Priority Data
Apr. 28, 2020    (DE) ............... 10 2020 111 510.5

(51) Int. Cl.
*B29C 48/64*    (2019.01)
*B29C 45/50*    (2006.01)
(Continued)

(52) U.S. Cl.
CPC .......... *B29C 45/60* (2013.01); *B29C 45/5008* (2013.01); *B29C 45/62* (2013.01);
(Continued)

(58) Field of Classification Search
CPC ......... B29C 45/64; B29C 45/65; B29C 48/64; B29C 48/65
See application file for complete search history.

(56) References Cited

U.S. PATENT DOCUMENTS 3,411,179 A * 11/1968 Gregory ................. B29C 48/67
425/197
3,687,423 A     8/1972 Koch et al.
(Continued)

FOREIGN PATENT DOCUMENTS

CA          932320 A    8/1973
DE      1 816 440 B1    10/1970
(Continued)

OTHER PUBLICATIONS

International Search Report issued in corresponding application, PCT/EP2021/060898; Mailing date: Jul. 28, 2021.
(Continued)

*Primary Examiner* — Timothy Kennedy
(74) *Attorney, Agent, or Firm* — Chrisman Gallo Tochtrop LLC (57) ABSTRACT

The application relates to a plasticizing unit with a cylinder and a screw that is rotatably mounted in the cylinder and has a screw section which is designed as a shearing section and in which a blocking web encircling the screw core in a helical manner and a main screw thread enclosed by the blocking web are provided. A shearing web runs in the main screw thread parallel to the blocking web at a lower height than the blocking web. In this manner, two screw threads are produced which run parallel to each other and are separated by the shearing web. The threads are designed in the form of wave screw threads. Each wave screw thread is equipped with one or more wave peaks with a surface which is designed in the form of a plateau and forms a wave peak shearing surface, wherein the wave peak shearing surface is
(Continued)

located at the same height as the surface of the shearing web in the region. The shearing web surface section which lies in the region of a wave peak shearing surface constitutes a shearing web sharing surface. A wave peak shearing surface and a shearing web shearing surface together form a total shearing surface. A specified total shearing surface together with the inner wall of the cylinder forms a shearing gap in accordance with a shearing gap size specified for the total shearing surface.

15 Claims, 7 Drawing Sheets

(51) Int. Cl.
| | |
|---|---|
| *B29C 45/60* | (2006.01) |
| *B29C 45/62* | (2006.01) |
| *B29C 48/385* | (2019.01) |
| *B29C 48/52* | (2019.01) |
| *B29C 48/575* | (2019.01) |
| *B29C 48/61* | (2019.01) |
| *B29C 48/625* | (2019.01) |
| *B29C 48/65* | (2019.01) |
| *B29C 48/68* | (2019.01) |
| *B29C 45/00* | (2006.01) |

(52) U.S. Cl.
CPC ............ *B29C 48/385* (2019.02); *B29C 48/52* (2019.02); *B29C 48/575* (2019.02); *B29C 48/61* (2019.02); *B29C 48/625* (2019.02); *B29C 48/64* (2019.02); *B29C 48/65* (2019.02); *B29C 48/682* (2019.02); *B29C 45/0013* (2013.01)

(56) References Cited

U.S. PATENT DOCUMENTS

| | | | | |
|---|---|---|---|---|
| 3,858,856 | A * | 1/1975 | Hsu | B29C 48/66 366/88 |
| 4,000,884 | A * | 1/1977 | Chung | B29C 48/535 366/322 |
| 4,143,974 | A * | 3/1979 | Strassheimer | B29C 45/63 366/89 |
| 4,173,417 | A * | 11/1979 | Kruder | B29C 48/65 366/89 |
| 4,227,870 | A * | 10/1980 | Kim | B29B 7/429 425/208 |
| 4,285,600 | A | 8/1981 | Kruder | |
| 4,356,140 | A | 10/1982 | Kruder | |
| 5,035,509 | A * | 7/1991 | Kruder | B29C 48/62 366/89 |
| 5,071,256 | A * | 12/1991 | Smith | B29C 48/62 366/89 |
| 5,219,590 | A * | 6/1993 | Kruder | B29C 48/53 366/89 |
| 5,599,097 | A * | 2/1997 | Christie | B29C 48/535 366/89 |
| 5,653,534 | A | 8/1997 | Matsumoto et al. | |
| 6,056,430 | A | 5/2000 | Medici, Jr. et al. | |
| 6,132,075 | A * | 10/2000 | Medici, Jr. | B29C 48/66 366/89 |
| 6,179,461 | B1 | 1/2001 | Christiano et al. | |
| 10,350,809 | B2 * | 7/2019 | Dray, Sr. | B29B 7/429 |
| 2004/0114455 | A1 * | 6/2004 | Uphus | B29C 48/40 366/85 |
| 2004/0141406 | A1 | 7/2004 | Womer et al. | |
| 2011/0217406 | A1 * | 9/2011 | Chung | B29C 48/53 425/209 |
| 2015/0085597 | A1 | 3/2015 | Schneider et al. | |
| 2018/0022003 | A1 | 1/2018 | Nobuta et al. | |
| 2020/0047387 | A1 * | 2/2020 | Gou | C08J 3/247 |
| 2020/0298458 | A1 | 9/2020 | Schadhauser et al. | |

FOREIGN PATENT DOCUMENTS

| | | | | |
|---|---|---|---|---|
| DE | 695 24 915 | T2 | 8/2002 | |
| DE | 600 19 303 | T2 | 3/2006 | |
| DE | 10 2012 008 023 | B4 | 6/2016 | |
| EP | 3 098 052 | B1 | 4/2018 | |
| GB | 1515890 | A * | 6/1978 | ............ B29C 47/38 |
| JP | S53-28656 | A | 3/1978 | |
| JP | H05318558 | A * | 12/1993 | |
| JP | 2013-208779 | A | 10/2013 | |
| WO | 01/17750 | A1 | 3/2001 | |
| WO | WO-2013156555 | A1 * | 10/2013 | ............... B01F 7/00 |
| WO | 2019/076561 | A1 | 4/2019 | |

OTHER PUBLICATIONS

Written Opinion issued in corresponding application, PCT/EP2021/060898; Mailing date: Jul. 28, 2021 (machine translation).

* cited by examiner

PLASTICIZING UNIT

CROSS-REFERENCE TO RELATED APPLICATIONS

This application is a U.S. National Stage entry of PCT/EP2021/060898, filed Apr. 27, 2021, which claims benefit of priority to German application 10 2020 111 510.5, filed Apr. 28, 2020, the entire disclosures of which are hereby incorporated herein by reference.

FIELD OF THE INVENTION

The invention relates to a plasticizing unit for processing a mixture of a plastic material and a filler, in particular a fibre material, wherein the plasticizing unit has a cylinder and a screw, by which the plastic material is melted and is mixed with the filling material, in particular the fibre material, so that a melt is produced, which can be delivered to a further use, for example an injection moulding process or an extrusion process.

BACKGROUND OF THE INVENTION

Screws with a so-called wave geometry or a so-called energy transfer geometry are known from the prior art. Such screws are also designated as wave screws or respectively as energy transfer screws. Wave screws are known for example from the patent documents U.S. Pat. Nos. 4,285,600 and 4,356,140. An energy transfer screw is disclosed in DE 10 2012 008 023 B4. These concern screws for the processing of a plastic material in a single-screw extruder, i.e. the screw is driven exclusively rotatably. The wave geometry is used substantially for a gentle and rapid melting of the delivered plastic material. Likewise with the wave geometry, a better mixing effect is achieved compared to standard screws. In the above-mentioned wave- and energy transfer screws, an offset blocking web is provided between two screw threads, in order to convey plastic melt from one thread into the other thread, i.e. in order to achieve a division of melt streams.

Injection moulding machines for the processing of plastic material which is mixed with fibres are known from EP 3098052 B1 and US 2018/0022003 A1. In these injection moulding machines, a rotatably and linearly driven screw is used. Such a screw is also designated as a reciprocating screw.

In the screw known from EP3098052 B1, there is a first section in which the delivered plastic material is melted. On the side remote from conveying, a second section adjoins, at the start of which a fibre material is delivered. In this section, a barrier web is arranged, which forms a greater distance with respect to the cylinder inner wall than the blocking web delimiting a screw thread. Thereby, a backflow of melted plastic material can be generated from a screw thread of the downstream side of the barrier web in the direction of a screw thread of the upstream side of the barrier web. EP3098052B1 discloses various embodiments of barrier webs.

US 2018/0022003 A1 discloses a plasticizing unit for processing a plastic-fibre mixture, wherein the plastic material and the fibre material are introduced together via a hopper into the cylinder. The screw of this plasticizing unit also has a barrier web. In addition, at one location a transition piece is provided in order to subject the plastic-fibre mixture to an intensive compression.

WO 2019/076561 A1 discloses the processing of a fibre-filled plastic melt with the use of a screw with a shearing part at the front end of the screw.

BRIEF SUMMARY OF THE INVENTION

The invention is based on the problem of indicating a plasticizing unit of the type named in the introduction, by which it is possible to provide a melt made of a plastic material with filler located therein, in particular a fibre material, wherein, at the front end of the screw, viewed in the conveying direction of the melt, and thus at the outlet of the plasticizing unit, as homogeneous a distribution as possible of the filler or respectively of the fibre material is present in the melt.

The solution to this problem occurs through the features of Claim 1. Advantageous embodiments and further developments are to be found in the dependent claims.

The solution according to the invention proceeds from the following considerations.

In order to ensure that a homogeneous distribution of filler is present in the melt at the end of the screw situated downstream (at the front), it is necessary that as far as possible each filler agglomerate, composed of individual filler particles, undergoes a material-dependent minimum amount of shear speed for the fragmenting (dispersive) mixing, and a minimum amount of shear time in the shear field for the distributing (distributive) mixing. Also resulting therefrom is a minimum amount of shear deformation, which is the product of shear speed and shear time.

In contrast to the present invention, a minimum amount of shear deformation is not ensured for each agglomerate in the wave screws named in the introduction, because here compressive- and shear stresses are significantly only produced through the summits or respectively tips of the wave peaks. In the energy transfer screws named in the introduction, the melt can additionally escape via the relatively narrow shearing web into the adjacent wave screw thread, with a very small shear time resulting therefrom. Thereby, the shear deformation exerted onto the agglomerates remains relatively small. Thus, not yet dispersed agglomerates of particles or respectively filler can be present at the screw end.

In the case of fillers, the spatial extent of which is distinctly greater in one spatial direction than in the other spatial directions, the challenge additionally presents itself that these fillers can mostly only be distributed homogeneously when they flow transversely to flow direction over a wave peak of a wave screw thread. The reason for this is that these elongated fillers generally have very good mechanical characteristics in longitudinal direction. If such fillers, in longitudinal direction, i.e. lying parallel to the flow direction of the melt, flow over a wave elevation or another flow barrier, these fillers are not influenced, or are only influenced to a small extent, by the shear stresses acting on them.

According to a core idea of the invention, therefore a plasticizing unit is to be provided with a screw which has a modified wave geometry, in order to take into account the above considerations. With a modified wave geometry according to the invention, it is to be ensured that any agglomerate of particles of a filler always undergoes a minimum amount of shear deformation t irrespective of its flow path, and namely without the particles of the agglomerate being damaged mechanically. If, in the case of a particle, for example an individual fibre is concerned, this means that this fibre is not significantly damaged in its length, i.e. shortened.

Based on the above considerations, a plasticizing unit is proposed for a machine processing plastic, in particular for an injection moulding machine or an extrusion system, which has a cylinder and a screw which mounted rotatably therein, wherein the screw has a screw section formed as a shearing section according to the invention. In the shearing section, configured according to the invention, the screw has a blocking web encircling the screw in a helical manner and a main screw thread enclosed by the blocking web. In the main screw thread, a shearing web is arranged, preferably running parallel to the blocking web, which shearing web has, at least in part, a smaller height than the blocking web. In these sections, the surface of the shearing web forms a shearing web shearing surface. In the main screw thread therefore two wave screw threads are formed, running parallel and spaced apart from one another by the shearing web. Each of these wave screw threads has a thread base, running in a wave-shaped manner, viewed in the conveying direction of the melt, wherein the wave peaks of the one wave screw thread, viewed in conveying direction of the melt, lie offset with respect to the wave peaks of the other wave screw thread. In each wave screw thread, one or more wave peaks are provided with a surface formed as a plateau and forming a wave peak shearing surface. The length Lw of a wave peak shearing surface is formed comparatively long, viewed in conveying direction of the melt, in particular compared to the width of the blocking web and/or the width of the shearing web is at least in part formed comparatively wide, in particular compared to the width of the blocking web and namely preferably in the sections of the surface of the shearing web which are formed as shearing web shearing surface.

The formation of a wave peak shearing surface as a plateau means that the surface of a wave screw thread has a constant radius with respect to the longitudinal axis of the screw in the region of the wave peak shearing surface. This region of a wave peak shearing surface has a length Lw, viewed in the conveying direction of the melt. This means that the surface of the wave screw thread has over this length Lw a constant radius with respect to the longitudinal axis of the screw. In a flattened view, a wave peak shearing surface forms a plane. Viewed in conveying direction of the melt, this plane has a length corresponding to the length Lw of the wave peak shearing surface. The width of this plane corresponds to the width of the wave screw thread.

The wave peak shearing surface can be formed as a rectangle or as a parallelogram. In both cases—viewed transversely to the conveying direction of the melt—a constant length Lw of the wave peak shearing surface results over the entire width of the wave screw thread. In other words, this means the following. Parallel to the shearing web and along a path from the shearing web to the blocking web (or vice versa), the length Lw remains constant. The length Lw corresponds to the side length of the rectangle or of the parallelogram at the side of the rectangle or of the parallelogram which adjoins the shearing web. This also applies with respect to the side of the rectangle or of the parallelogram which adjoins the blocking web.

The wave peak shearing surface can, however, also have a different shape. For example, the wave peak shearing surface could be formed as a trapezium or as another polygon. In these cases, the length Lw is to be defined as the minimum extent $L_{min}$ of the thus configured wave peak shearing surface, viewed in conveying direction of the melt. In other words, this means the following. There is a line in the wave peak shearing surface running parallel to the shearing web or respectively to the blocking web, which line in the wave peak shearing surface has the above-mentioned minimum length $L_{min}$. This line of the length $L_{min}$ constitutes the reference for the length Lw of the thus formed wave peak shearing surface. This means that the length $L_{min}$ is to be regarded as the length Lw of a thus configured wave peak shearing surface.

According to a first embodiment, provision can be made that with respect to the screw diameter D, the length Lw of a wave peak shearing surface, viewed in conveying direction of the melt, has a dimension of at least 0.15×D, preferably greater than or equal to 0.20×D, most particularly preferably greater than or equal to 0.30×D. Additionally or alternatively thereto, provision can be made that the width of the shearing web has at least in part a dimension of at least 0.15×D, preferably greater than or equal to 0.20×D, most particularly preferably greater than or equal to 0.30×D. The width of the shearing web can preferably have the above-mentioned dimension in the sections of the surface of the shearing web which are formed as shearing web shearing surface (SFs).

The surface of the shearing web forms with the inner wall of the cylinder a shearing web shearing gap, and the surface of a wave peak shearing surface forms with the inner wall of the cylinder a wave peak shearing gap. According to a configuration of the invention, the size of the shearing web shearing gap at least in the region a shearing web shearing surface can have a value between 0.1 mm to 1.2 mm, and/or the size of the wave peak shearing gap can have a value between 0.1 mm to 1.2 mm.

According to a further configuration, provision can be made that the size of the shearing web shearing gap at least in the region of a shearing web shearing surface (SFS) has a value between 0.2 mm to 2.0 mm, preferably between 0.3 mm to 0.9 mm, most particularly preferably between 0.4 mm to 0.8 mm, and/or the size of the wave peak shearing gap has a value between 0.2 mm to 2.0 mm, preferably between 0.3 mm to 0.9 mm, most particularly preferably between 0.4 mm to 0.8 mm.

Depending on which shearing gap (shearing web-shearing gap)/wave peak-shearing gap) has which value, different case constellations can be present. Thus, one or more wave peak shearing surfaces can lie at least in the region of a shearing web shearing surface at the same height as the surface of the shearing web and/or one or more wave peak shearing surfaces at least in the region of a shearing web shearing surface can lie lower than the surface of the shearing web and/or one or more wave peak shearing surfaces at least in the region of a shearing web shearing surface can lie higher than the surface of the shearing web.

Provision can also be made that the surface of the shearing web, viewed in conveying direction of the melt, has a profile, therefore does not have the same height continuously, or is formed continuously even with a positive or negative incline. The profile can be in particular a step-shaped or a wave-shaped profile. Preferably, the profile can be configured such that the surface of the shearing web in the region of a wave peak lies lower than in the other regions, and that in the region of a wave trough the surface of the shearing web preferably lies at the same height as the surface of the blocking web. Thereby, it can be achieved that the melt undergoes a division predominantly only in the region of the wave peaks, and in this region melt flows over the shearing web into the adjacent wave screw thread. In the remaining regions, an overflowing of the shearing web is, rather, prevented. In particular, when the surface of the shearing web lies at the same height as the surface of the blocking web, an overflowing into an adjacent screw thread is prevented.

Furthermore, the size of the shearing web shearing gap and/or the size of the wave peak shearing gap can become smaller in conveying direction of the melt. Here, the maximum size of one of the above-mentioned shearing gaps can lie in the range of 1 mm to 2 mm, preferably in the range of 1.2 mm to 1.6 mm. This maximum size, viewed in conveying direction of the melt, is present at the start of the shearing section according to the invention. The minimum size of one of the above-mentioned shearing gaps can lie in the range of 0.2 mm to 0.8 mm, preferably in the range between 0.3 mm to 0.4 mm. This minimum size, viewed in conveying direction of the melt, lies at the end of the shearing section according to the invention.

Provision can be made that the wave peak shearing surface is situated at the same height as the surface of the shearing web in this region. The section of the surface of the shearing web which lies in the region of a wave peak shearing surface, constitutes a shearing web shearing surface. The surface of the shearing web has, in this region, the same constant radius with respect to the longitudinal axis of the screw as the surface of the wave peak shearing surface. A wave peak shearing surface and a shearing web shearing surface form together an overall shearing surface. A particular overall shearing surface forms with the inner wall of the cylinder a shearing gap according to a specified shearing gap size for this overall shearing surface. As a result, a formation of the overall shearing surface as a plateau is produced. This means that the surface of the wave screw thread and the surface of the shearing web over the length Lw of a wave peak shearing surface have the same radius with respect to the longitudinal axis of the screw. In a flattened view, an overall shearing surface forms a plane with a constant radius with respect to the longitudinal axis of the screw. Viewed in conveying direction of the melt, this plane has a length corresponding to the length Lw of the wave peak shearing surface. The width of this plane corresponds to the sum of the width of the wave screw thread and the width of the shearing web. The plane can preferably be formed as a rectangle. However, it can also be formed entirely or partially as a parallelogram. In particular, the shearing web shearing surface can be formed as a rectangle and the wave peak shearing surface can be formed as a parallelogram, or vice versa.

The above-mentioned plateau forms a curved plane with a radius corresponding to the radius of the thread base of the associated wave screw thread in this region. In conveying direction of the melt, this plane has a length Lw and a width corresponding to the thread width of the wave screw thread. The plane preferably forms the shape of a rectangle with the length Lw and with the width of the corresponding wave screw thread. However, in top view the plane can also have different shapes, for example it could be formed as a parallelogram. The above-mentioned plateau lies over a certain length at the same height as the surface of the shearing web. A wave peak shearing surface is thus in connection with the shearing web surface over a certain length, wherein both shearing surfaces lie at one height. In other words, the wave peak shearing surface and the shearing web shearing surface lie in a curved plane with a shared radius and collectively form a shared overall shearing surface. Ultimately, the concern is only in having a wave peak shearing surface of suitable size, which can cooperate with a shearing web shearing surface of suitable size. Here, the plane of a wave peak can be in connection over a certain length with the surface of the shearing web. In the case of a rectangular plane, this corresponds to the above-mentioned length Lw. In the case of a parallelogram, the side of the parallelogram adjoining the shearing web can have this length Lw.

The length of the shearing section of the screw depends on the respective case of application. For example, it depends on whether the screw is to be used as a reciprocating screw for an injection moulding machine or as a screw of a single-screw extruder. Furthermore, it depends on which materials are to be processed with the screw. Therefore, the entire screw can also be configured with one shearing section or respectively the screw has only one single screw section which is configured as a shearing section.

A preferred field of application of the invention is the processing of fillers, the spatial extent of which is distinctly greater in one spatial direction than into the other spatial directions. Such fillers can also be designated as elongated fillers. In particular fibre material, for example as cut fibre granulate, comes into consideration as elongated fillers. In such granulates, the fibre material is present in fibre bundles which it is necessary to disperse and which are to undergo a reorientation in the melt.

With the shearing section configured according to the invention, it is ensured that any agglomerate of particles always undergoes a minimum amount of shear speed and shear time (shear deformation) irrespective of the flow path, without significantly damaging individual particles mechanically. Consequently, a filler, in particular a fibre material which is processed by the plasticizing unit and is missed with plastic, is also minimally damaged mechanically.

In contrast to the wave screws named in the introduction, according to the invention a plateau is provided on a wave peak, whereby the shear speed exerted on the filler particles, in particular fibre material, is reduced and the shear time is extended. The input of shear deformation into the filler material or respectively fibre material is therefore not predominantly dependent on the maximum shear speed. Thereby, a particularly gentle dispersive mixing process is produced. As the shearing web also forms a shearing surface, the input of shear energy into the particles which escape via the shearing web into the rearward wave screw thread is kept to an identical level compared to the particles which flow through the plateau of a wave peak.

Depending on the width of the blocking web, the shearing web can have a distinctly larger width than the blocking web. In particular, the width of the shearing web can have a multiple of the width of the blocking web, preferably the width of the shearing web can have 2 times up to 5 times the width of the blocking web.

An additional aspect concerns fillers, the spatial extent of which is distinctly greater in one spatial direction than into the other spatial directions. In many cases, this concerns a fibre material which has fibre bundles. However, it can also concern a different material, such as for example needle-shaped mineral fillers or platelet-shaped pigments. For the dispersing of fibre bundles or respectively agglomerates of fibres, the orientation of the fibres is critical in the region of a shearing surface and hence in the shearing gap formed between this shearing surface and the cylinder. Tests have shown that agglomerates with fibres oriented transversely to the flow direction of the melt show a better dispersing on flowing through a shearing gap than agglomerates in which the fibres lying parallel to the flow direction flow through the shearing gap. The additional shearing surface on the shearing web makes provision that the melt on the one hand is given the possibility of escaping into the rearward wave screw thread and is thus reoriented through flow mechanisms, on the other hand the melt can flow away over the plateau of the wave peak, which constitutes a wave peak shearing surface. With the configuration according to the invention, with two shearing surfaces, namely a wave peak shearing surface and a shearing web shearing surface, it is additionally achieved that there are sufficient fibre bundles which are oriented transversely to the respective flow direction of the melt when they flow over a shearing surface or respectively through a shearing gap. Ideally, at each wave peak approximately a half of agglomerates should be present, in which the fibres are oriented so that they lie transversely to the flow direction of the melt component which flows over the wave peak shearing surface, so that the fibres flow through the wave peak shearing gap in this orientation. The above applies in an analogous manner for the melt component which flows through the shearing web shearing gap adjoining this wave peak over the shearing web shearing surface in the direction of the adjacent wave screw thread. This means that ideally also in this melt component a half of agglomerates is present in which the fibres are oriented so that they lie transversely to the flow direction of this melt component.

According to a configuration of the invention, the shearing web can have a greater width than the blocking web. In particular, the width of the shearing web can have a multiple of the width of the blocking web, preferably the width of the shearing web can have 2 times up to 5 times the width of the blocking web.

According to an advantageous configuration, several overall shearing surfaces (SFn) can be present in both wave screw threads, and the shearing gap size Dn (n=1,2,3 . . . ) can become smaller or respectively decrease in conveying direction of the melt. With this provision, an increasing shear intensity can be produced over the screw length. Together with a division of the melt stream several times, it can thus be guaranteed that agglomerates with fibres which still lie in flow direction on a shearing surface are also broken down on a subsequent shearing surface after their reorientation as a result of the dividing of the melt stream, because the fibres are then aligned transversely to the flow direction.

According to a further advantageous configuration, in the region of an overall shearing surface (SFn) the width of the shearing web can be smaller on its surface or of equal size to the length Lw of a wave peak shearing surface, viewed in conveying direction of the melt, wherein the width preferably has a lower threshold value of between 50% and 60% and an upper threshold value of between 80% and 90% of the length Lw. It can thereby be achieved that a certain minimum quantity of fibre material can flow over the shearing surface of a shearing web. Furthermore, as a result of the alignment of the fibres in a fibre bundle transversely to the flow direction on flowing over this shearing surface, a better dispersing of the fibre bundles can be achieved.

Preferably, the arrangement of the wave peak shearing surfaces and the length Lw of the wave peak shearing surfaces should be such that the wave peak shearing surfaces of the one wave screw thread and the wave peak shearing surfaces of the other wave screw thread, viewed in conveying direction of the melt, are spaced apart from one another, wherein preferably one wave peak shearing surface in the one wave screw thread is associated with a wave trough in the other wave screw thread. This configuration has a positive effect on the dividing of the melt stream several times.

According to a further development, provision can be made that a wave peak, viewed in conveying direction of the melt, has an ascending flank lying before the wave peak shearing surface (SFw) and a descending flank lying after the wave peak shearing surface (SFw). The ascending flank forms a first angle (α) with the surface of the shearing web, wherein the descending flank forms a second angle (β) with the surface of the shearing web, and wherein the first angle (α) is smaller than the second angle (β). Thus, viewed in flow direction of the melt, in front of a plateau of a wave peak a relatively flatly ascending flank is formed, and after this plateau a relatively steeply descending flank is formed. Thereby, the advantage results that through a sudden relaxing of the viscoelastic melt, a swelling behaviour of the melt is to be observed. The melt is deformed by pressing through a shearing gap. At the shearing gap outlet, the stress applied by the shearing gap is dispensed with, and the polymer molecules return into the thermodynamically more favourable form of undisturbed clusters. The melt expands accordingly at right-angles to the flow direction. The non-dispersed solid material particles situated in the melt undergo a force oriented at right-angles to the flow direction, which enables a dispersing of the solid material particles in the melt.

According to a configuration of the invention, the cylinder with the screw formed with a shearing section can constitute a first cylinder and in addition to the first cylinder, a second cylinder can be provided with a second screw. The additional, second cylinder has at its front end an outlet which is in fluidic connection with an inlet in the rear region of the first cylinder. The second cylinder is provided for the production of a melted plastic material (P), wherein the melted plastic material (P) can be passed from the second cylinder into the first cylinder. At the first cylinder, an inlet is provided for the addition of filler, preferably fibre material (F), in particular for cut fibre granulate. The inlet for the melted plastic material (P) and the inlet for the filler or respectively the fibre material (F) are arranged on the first cylinder, viewed in conveying direction of the melt, before the shearing section (B).

A plasticizing unit according to the invention can be used in an injection moulding machine. Such an injection moulding machine comprises a clamping unit and a plasticizing— and injecting unit, wherein the plasticizing—and injecting unit of this injection moulding machine has a plasticizing unit according to the invention, and wherein the screw is operatively connected to a rotary- and a linear drive. A plasticizing unit according to the invention can also be used in an extrusion system. Such an extrusion system comprises a plasticizing unit, wherein, viewed in conveying direction of the melt, an extrusion tool and, if applicable, further system parts of an extrusion system are arranged downstream of the cylinder, wherein the concern is with system parts according to an extrusion product which is to be produced.

BRIEF DESCRIPTION OF THE DRAWINGS

The invention is to be described more closely below with the aid of example embodiments and with reference to FIGS. 1 to 11. There are shown.

DESCRIPTION OF EXAMPLE EMBODIMENTS

Figure 1:
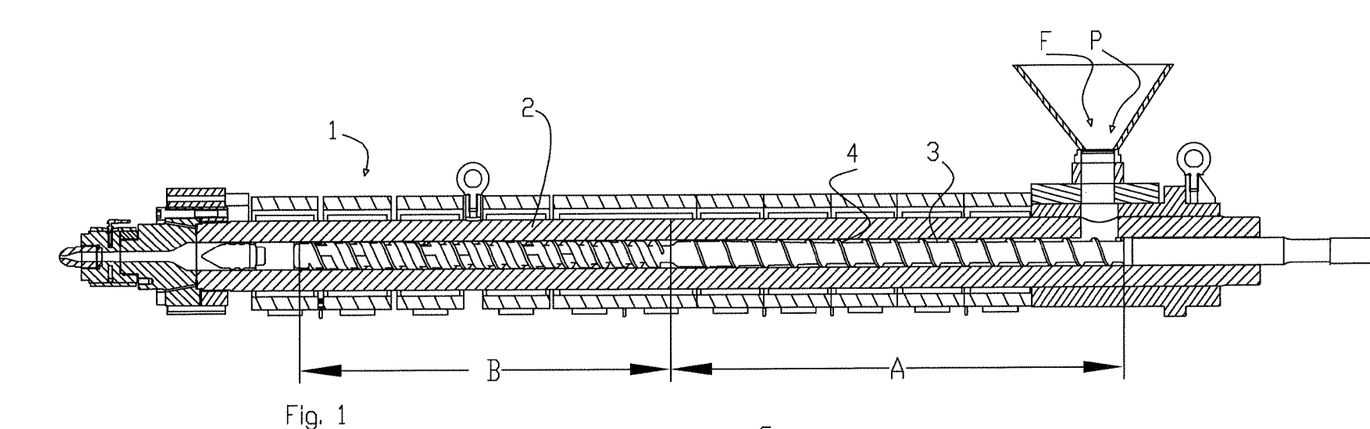
FIG. 1 schematic illustration of a plasticizing unit

In the following embodiments, a fibre material is to be used as filler. FIG. 1 shows in schematic illustration a plasticizing unit 1, marked as a whole by reference number 1, comprising a cylinder 2 and a screw 3 with a screw web 4 encircling in a helical manner. When the plasticizing unit 1 is to be embodied as a component of an injection moulding machine, the screw 3 is formed as a reciprocating screw and can be rotated by means of a suitable drive unit and moved in longitudinal direction. When the plasticizing unit 1 is to be embodied as a component of an extrusion machine, only a rotary drive is necessary for the screw 3.

The screw 3 has several sections A and B. In a first section A a plastic material P, which is introduced via a feeding hopper, is drawn in and melted. Via this feeding hopper, a fibre material F is also added. The section A is embodied in the manner of a three-zone screw and thus has a feed zone, a compression zone and a metering zone. Viewed in conveying direction of the melt, a shearing section B according to the invention adjoins. At the start of the section B, a mixture of melted plastic material P and fibre material F is present. Plastic material P and fibre material F can be fed into the cylinder 2 via one and same feeding hopper, as in FIG. 1. The fibre material F can, however, also be added after the plastic material P, viewed in conveying direction. The mixture of melted plastic material P and fibre material F is conveyed through the section B by rotation of the screw 3. The section B is formed according to the invention as shearing section B, as is explained more closely further below. At the end of the section B, a mixture of melt of plastic material P and fibre material F distributed therein is present, wherein the fibre material F, owing to the action in section B has become dispersed such that the individual filaments of the fibre material F are present distributed in a largely homogeneous manner in the mixture. A screw with a shearing section configured according to the invention can also be designated here as a shear energy screw.

The configuration of the shearing section B is to be described more closely in the following with the aid of FIGS. 2 to 7.

Figure 2:
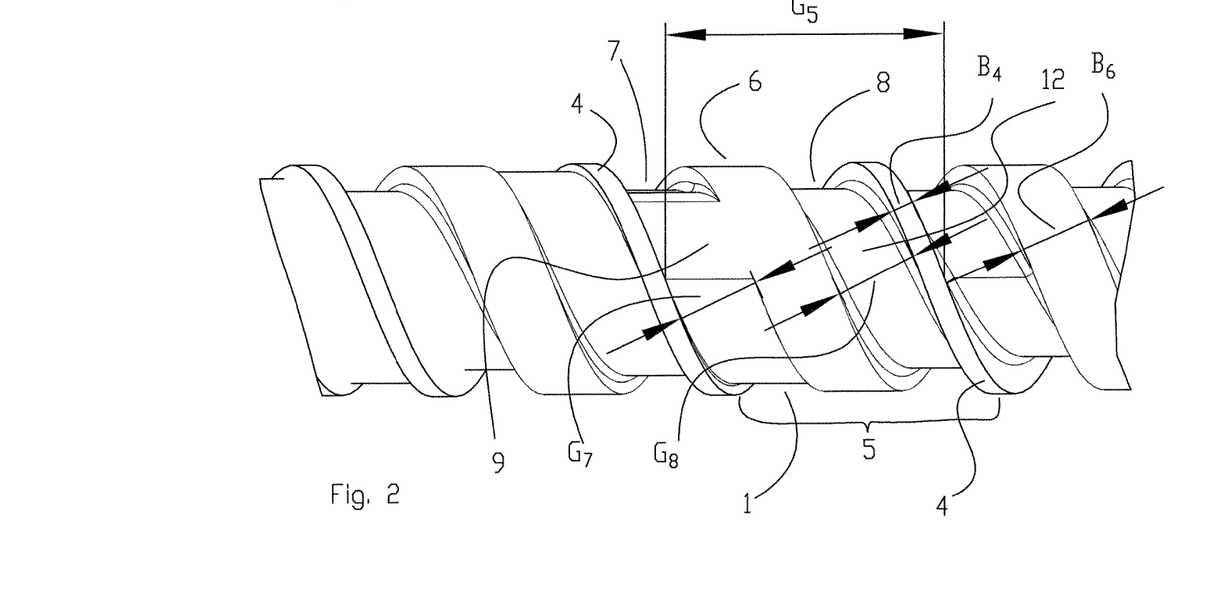
FIG. 2 cutout of the shearing section B of the screw of FIG. 1
Figure 3:
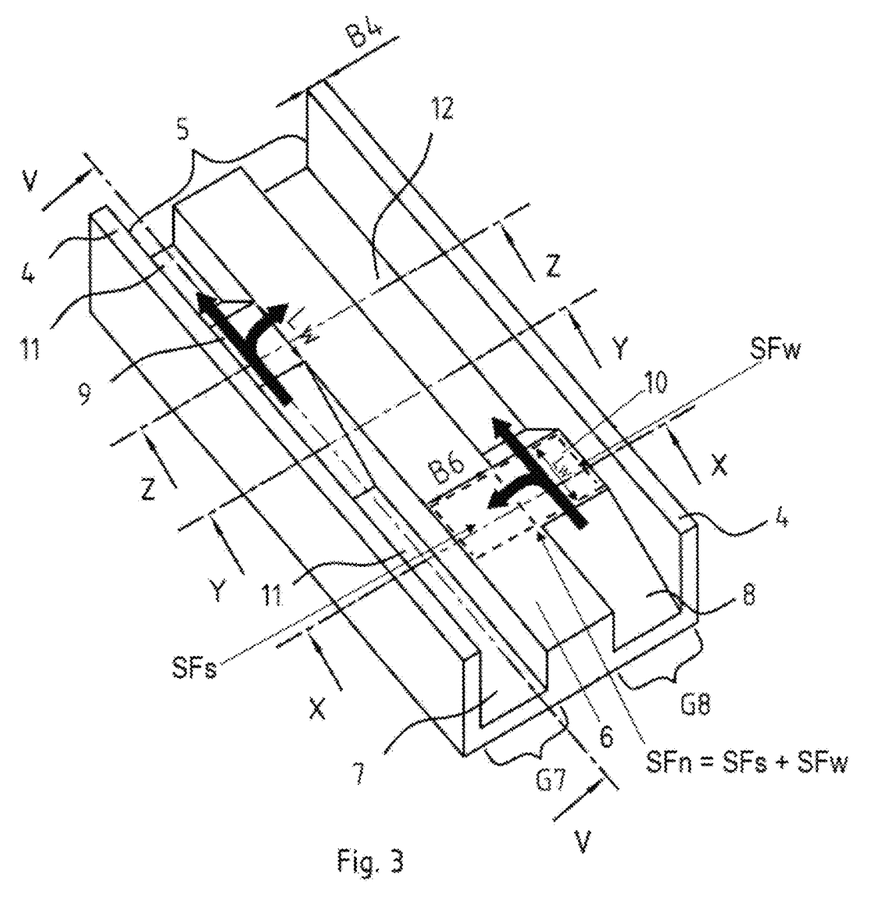
FIG. 3 perspective illustration of a flattened portion of the shearing section B of the screw of FIG. 1

FIG. 2 shows a cutout of a screw 3 with shearing section B configured according to the invention, and FIG. 3 shows a perspective illustration of a flattened partial portion of the shearing section B of the screw 2. The screw web 4 is formed as a shearing web, i.e. it forms with the cylinder inner wall a blocking gap SP. The size of the blocking gap SP is dimensioned so that no or only a little melt can flow through this blocking gap SP. The size of this gap corresponds to half the screw clearance in the cylinder 2. The encircling blocking web 4 forms a main screw thread 5 of the thread width $G_5$. In the main screw thread 5, a further web is provided as shearing web 6, and is arranged in the main screw thread 5 so that two screw threads 7 and 8 are present on both sides of the shearing web 6. As is explained more closely further below, the two screw threads 7 and 8 are formed with a thread base configured in a wave-shaped manner, viewed in conveying direction of the melt, i.e. in the manner of a so-called wave screw. Therefore, these screw threads are also to be designated here as wave screw threads 7 and 8. The thread widths $G_7$ and $G_8$ of the wave screw threads 7 and 8 are of equal size. The course of the wave screw threads 7 and 8 is such that a wave peak 9 in the wave screw thread 7 and a wave trough 12 in the wave screw thread 8 occur together at a position on both sides of the shearing web 6 or over a portion on both sides of the shearing web 6. Provision is also made that a wave peak 10 in the wave screw thread 8 and a wave trough 11 in the wave screw thread 7 occur together at a position on both sides of the shearing web 6 or via a portion on both sides of the shearing web 6. This course of the wave screw threads 7 and 8 is analogous to the principle as is known in the so-called double-wave screws of the prior art named in the introduction (U.S. Pat. Nos. 4,285,600 and 4,356,140).

According to the invention, on the one hand the width Be of the shearing web 6 is distinctly greater than the width $B_4$ of the blocking web 4. Furthermore, the height of the wave peaks 9, 10 is dimensioned such that in each wave screw thread 7, 8 there is a portion in which the surface of the shearing web 6 and the surface of a wave peak form a shared surface. In addition, the wave peaks are formed with a plateau, i.e. there is a surface of a wave peak which in conveying direction of the melt has a length Lw and the width of which corresponds to the thread width $G_7$, $G_8$ of a wave screw thread 7, 8. The above-mentioned shared surface of shearing web 6 and wave peak 9, 10 is therefore present over the entire length Lw of the area of a wave peak 9, 10. The width of the shared surface corresponds to the sum of the width $B_6$ of the shearing web 6 and of the thread width $G_7$, $G_8$ of the wave peak 9, 10 respectively involved in the shared surface.

The function of the above-mentioned shared surface consists in exerting a shear effect on the mixture of plastic material P and fibre material F which is present in a wave screw thread and flowing up a wave peak, and in dividing this mixture according to flow such that a portion continues to flow over the plateau of the wave peak and remains in the wave screw thread in which the mixture has arrived, and that another portion flows over the shearing web away into the adjacent wave screw thread. Therefore, the shared surface is also to be designated in the following as overall shearing surface SF. This overall shearing surface SF is therefore composed of a shearing surface SFw corresponding to the surface of the plateau of a wave peak 9, 10 and a shearing surface SFs of a shearing web 6, which corresponds to the product of the length Lw of the shearing surface SFw and the width $B_6$ of the shearing web 6, i.e. $SFs = Lw \times B_6$.

Depending on whether the shearing surface SFw is present with a wave peak 9 in the wave screw thread 7 or with a wave peak 10 in the wave screw thread 8, the following shearing surfaces can be differentiated.

$SFw_7 = Lw \times G_7$ (shearing surface with wave peak in wave screw thread 7)

$SFw_8 = Lw \times G_8$ (shearing surface with wave peak in wave screw thread 8)

The configuration of the wave screw threads 7 and 8 and of the shearing web 6 is such that the width $B_6$ of the shearing web 6 is smaller than or equal to the length Lw of a shearing surface SFw with a wave peak. In a preferred embodiment, the width Be can assume a value of 50% of Lw and greater. Most particularly preferably, the lower limit of $B_6$ lies between 50% and 60% of Lw and the upper limit of $B_6$ lies between 80% and 90% of Lw. Suitable numerical values are directed to which plastic material P and which fibre material F is to be processed. The ratio of width $B_6$ to length Lw should be such that for the material which is to be processed in the region of an overall shearing surface SF a division of the material stream results, according to which at least half of the incoming material flows via the shearing web 6 into the adjacent wave screw thread.

Viewed in flow direction, in each of the wave shear threads 7, 8 several wave peaks 9 or respectively 10 are to follow one another. An arrangement with two to five wave peaks following one another can be regarded as sufficient for most applications. However, it may also occur that a greater number of wave peaks is necessary.

FIG. 3 shows a perspective illustration of a flattened partial portion of the shearing section B of the screw 2. It can be seen there how a wave peak in the wave screw thread and a wave trough in the other wave screw thread lie adjacent to one another. The lengths of the Lw in the plateaus of the wave peaks is dimensioned so that the shearing surfaces $SFw_7$ of the wave peaks 9 in the wave screw thread 7 and the shearing surfaces $SFw_8$ of the wave peaks 10 in the wave screw thread 8 have a sufficient distance from one another. Owing to the offset of the shearing surfaces, a partial flow occurs from one wave screw thread into the other and back, and namely always via the shearing surface SFs of the shearing web 6, which forms with the respective shearing surface of a wave peak a shared surface or respectively overall shearing surface SF.

The length Lw of a wave peak shearing surface, viewed in conveying direction of the melt, is configured to be comparatively long, in particular compared to the width of the blocking web and/or the width of the shearing web is configured to be at least partially comparatively wide, in particular compared to the width of the blocking web and namely preferably in the portions of the surface of the shearing web formed as a shearing web shearing surface.

According to an embodiment, provision can be made that with respect to the screw diameter D the length Lw of a wave peak shearing surface, viewed in conveying direction of the melt, has a dimension of at least 0.15×D, preferably greater than or equal to 0.20×D, most particularly preferably greater than or equal to 0.30×D. Additionally or alternatively thereto, provision can be made that the width of the shearing web has at least in part a dimension of at least 0.15×D, preferably greater than or equal to 0.20×D, most particularly preferably greater than or equal to 0.30×D. The width of the shearing web can preferably have the above-mentioned dimension in the portions of the surface of the shearing web configured as shearing web shearing surface (SFs).

Figure 4:
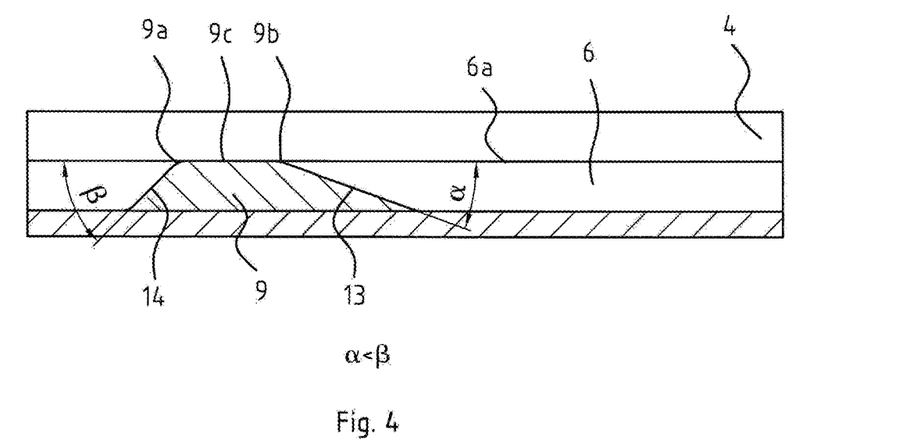
FIG. 4 section V-V in FIG. 3

FIG. 4 shows a section along the line V-V in FIG. 3 and namely in a view from the direction of the arrow to the line V-V in FIG. 3. Consequently, in the wave screw thread 7 the thread base is formed ascending in flow direction (from right to left in FIG. 4) and adjoins the surface 6a of the shearing web 6 with an angle α. This is the start 9a of the plateau of the wave peak 9. From there, the surface 9c of the wave peak 9 runs over a length Lw at the same height as the surface 6a of the shearing web 6. Starting from the end 9b of the plateau of the wave peak 9, the wave peak 9 descends with an angle β in the direction of the thread base of the wave screw thread 7, until the valley floor of the wave screw thread 7 is reached, which is designated in FIG. 3 by reference number 11. In viewing direction behind the shearing web 6 the portion of the blocking web 4 projecting beyond the shearing web 6 can be seen. The wave peaks are configured such that a slowly ascending flank 13 and a steeply descending flank 14 are produced, i.e. α<β.

Figure 5:
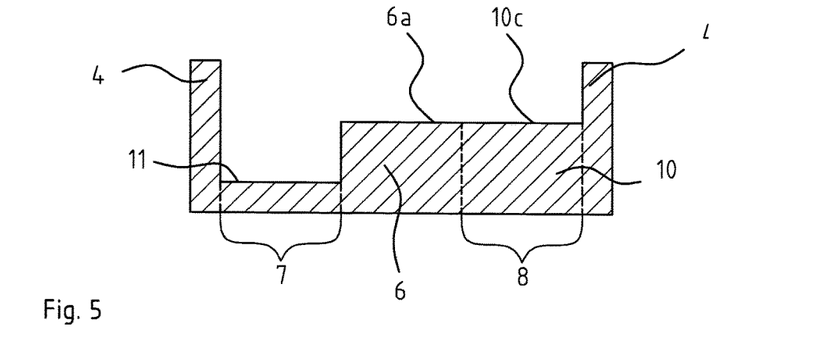
FIG. 5 section X-X in FIG. 3
Figure 6:
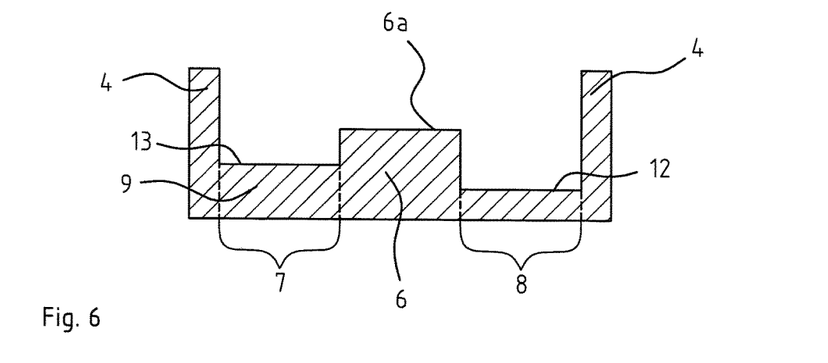
FIG. 6 section Y-Y in FIG. 3
Figure 7:
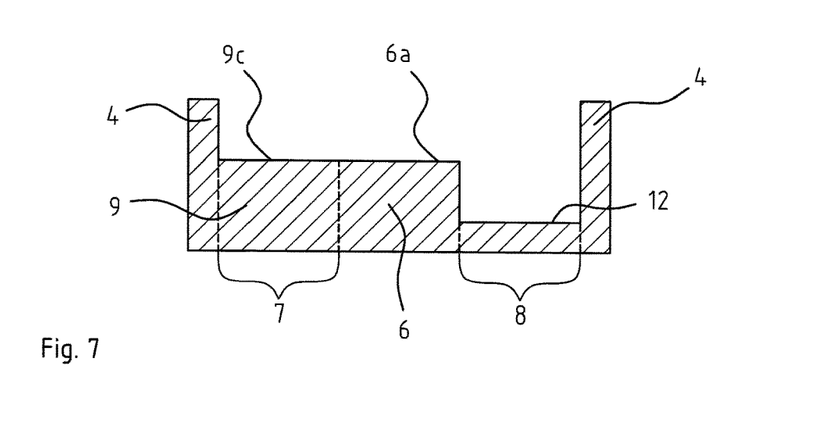
FIG. 7 section Z-Z in FIG. 3

In FIGS. 5, 6 and 7 further sections from FIG. 3 are illustrated, which are selected so that, viewed in flow direction of the melt, they lie one behind the other.

FIG. 5 shows a section along the line X-X in FIG. 3, where it can be seen that in the wave screw thread 8 the plateau of the wave peak 10 is present with its surface 10c, and the thread base of the wave screw thread 8 therefore lies at the same height as the surface 6a of the shearing web 6. In the wave screw thread 7, on the other hand, a wave trough 11 is present, i.e. the thread base in the wave screw thread 7 has its lowest level at this point. The dashed lines mark the connection points between blocking web 4, wave screw threads 7, 8 and shearing web 6.

FIG. 6 shows a section along the line Y-Y in FIG. 3, where it can be seen that at this point of the screw in both wave screw threads 7 and 8 the respective thread base has a height which lies below the surface 6a of the shearing web 6. The thread base in the wave screw thread 7 lies slightly higher than the thread base in the wave screw thread 8, because in the wave screw thread 7 the line Y-Y intersects the ascending surface 13 of the wave peak 9 and in the wave screw thread 8 a wave trough 12 is present there.

FIG. 7 shows a section along the line Z-Z in FIG. 3, where it can be seen that in the wave screw thread 7 the plateau of the wave peak 9 is present with its surface 9c, and the thread base of the wave screw thread 7 therefore lies at the same height as the surface 6a of the shearing web 6. In the wave screw thread 8, on the other hand, a wave trough 12 is present, i.e. the thread base in the wave screw thread 8 has its lowest level at this point.

The surface of the shearing web forms with the inner wall of the cylinder a shearing web shearing gap $S_{Z1}$, and the surface of a wave peak shearing surface forms with the inner wall of the cylinder a wave peak shearing gap $S_{Z2}$. According to a configuration of the invention, the size of the shearing web shearing gap $S_{Z1}$ at least in the region of a shearing web shearing surface can have a value of between 0.1 mm to 1.2 mm and/or the size of the wave peak shearing gap $S_{Z2}$ can have a value of between 0.1 mm to 1.2 mm. Depending on which shearing gap (shearing web shearing gap $S_{Z1}$/wave peak shearing gap $S_{Z2}$) has which value, different case constellations can be present. Thus, one or more wave peak shearing surfaces at least in the region of a shearing web shearing surface can lie at the same height as the surface of the shearing web (see FIGS. 3, 5 and 7) and/or one or more wave peak shearing surfaces at least in the region of a shearing web shearing surface can lie lower than the surface of the shearing web and/or one of more wave peak shearing surfaces at least in the region of a shearing web shearing surface can lie higher than the surface of the shearing web. Furthermore, the size of the shearing web shearing gap $S_{Z1}$ and/or the size of the wave peak shearing gap $S_{Z2}$ can become smaller in conveying direction of the melt.

Between an overall shearing surface SF and the inner wall of the cylinder 2, a gap SZ is present, which is also to be designated in the following as shearing gap SZ. The size of this shearing gap SZ with a specified shearing surface SFn (n=1, 2, . . . ) is to be designated in the following by Δn (n=1, 2, 3, . . . ). The screw 2 is configured such that the shearing gap SZ becomes smaller, viewed in flow direction, i.e. Δ1>Δ2>Δ3 and so on. Thereby, the following effect is achieved: Through the reduction of the shearing gap SZ, an increase of the shear deformation is produced, which leads to an improvement of the dispersive and distributive mixing effect with the aim of further dispersing the agglomerates which are becoming smaller over the length of the process.

Figure 8:
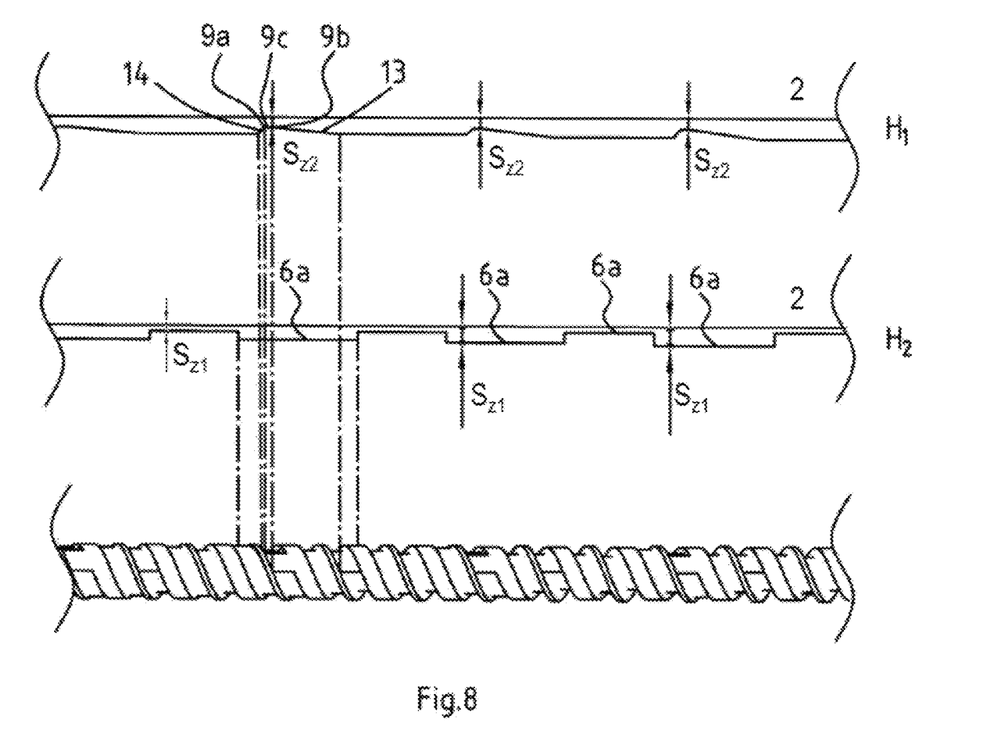
FIG. 8 course of the size of the shearing gap

In FIG. 8 an embodiment is illustrated in which the surface 6a of the shearing web 6, viewed in conveying direction of the melt, is formed with a profile, therefore does not have the same height continuously as in FIGS. 3 to 7. The profile can be, in particular, a step-shaped profile or a wave-shaped profile. Preferably, the profile is configured such that the surface 6a of the shearing web 6 in the region of a wave peak 9, 10 lies lower than in the other regions and that in the region of a wave trough the surface 6a of the shearing web 6 preferably lies at the same height as the surface of the blocking web 4. Such a profile—as a stepped profile—is illustrated in FIG. 8.

Figure 9:
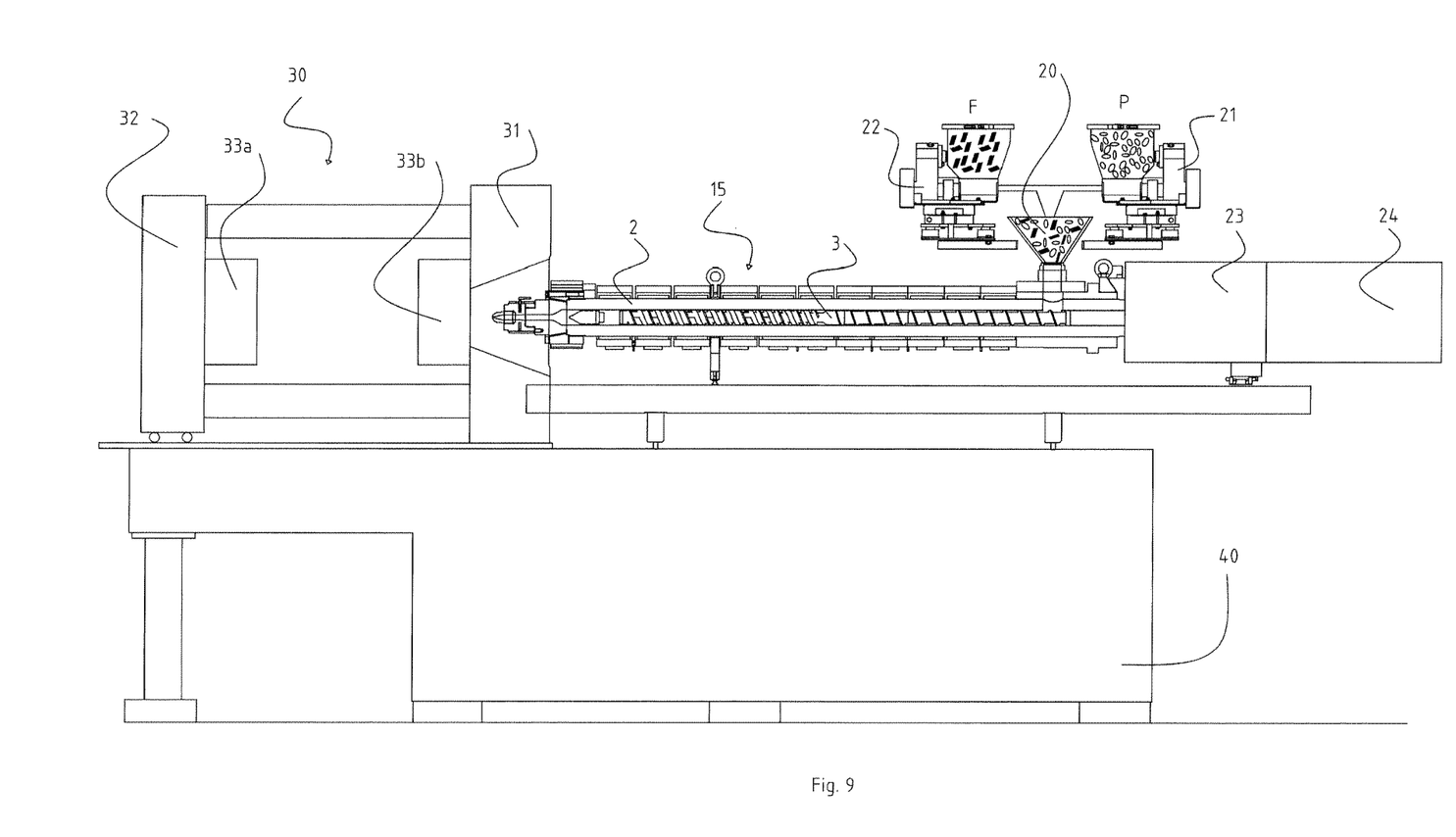
FIG. 9 injection moulding machine with first embodiment of a plasticizing- and injecting unit according to the invention FIG. 10 injection moulding machine with a second embodiment of a plasticizing- and injecting unit according to the invention FIG. 11 further embodiment of a plasticizing unit according to the invention

FIG. 9 shows an example embodiment of an injection moulding machine with a plasticizing- and injecting unit 15 and a clamping unit 30, which are both supported on a machine bed 40. The plastic material P and the fibre material F are fed together via a feeding hopper 20 into the cylinder 2. Here, a finished premixture can be used or—as illustrated—the plastic material P and the fibre material F are delivered to the feeding hopper 20 via separate metering devices, namely a fibre material metering device 21 and a plastic material metering device 22. The screw 2 is configured as a reciprocating screw, i.e. it is operatively connected at its rear end with a rotary drive 23 and with a linear drive 24. The clamping unit 30 can be in accordance with a known type of construction and is therefore only illustrated schematically. It comprises substantially a fixed platen 31 and a movable platen 32, movable with respect thereto. Furthermore, a movable mould half 33a and a fixed mould half 33b of an injection moulding tool are provided, which in closed state form one or more cavities. When the plasticizing- and injecting unit 15 is docked onto the fixed mould half 33b, a mixture of plastic material P and fibre material F can be injected into the cavity in a known manner.

Figure 10:
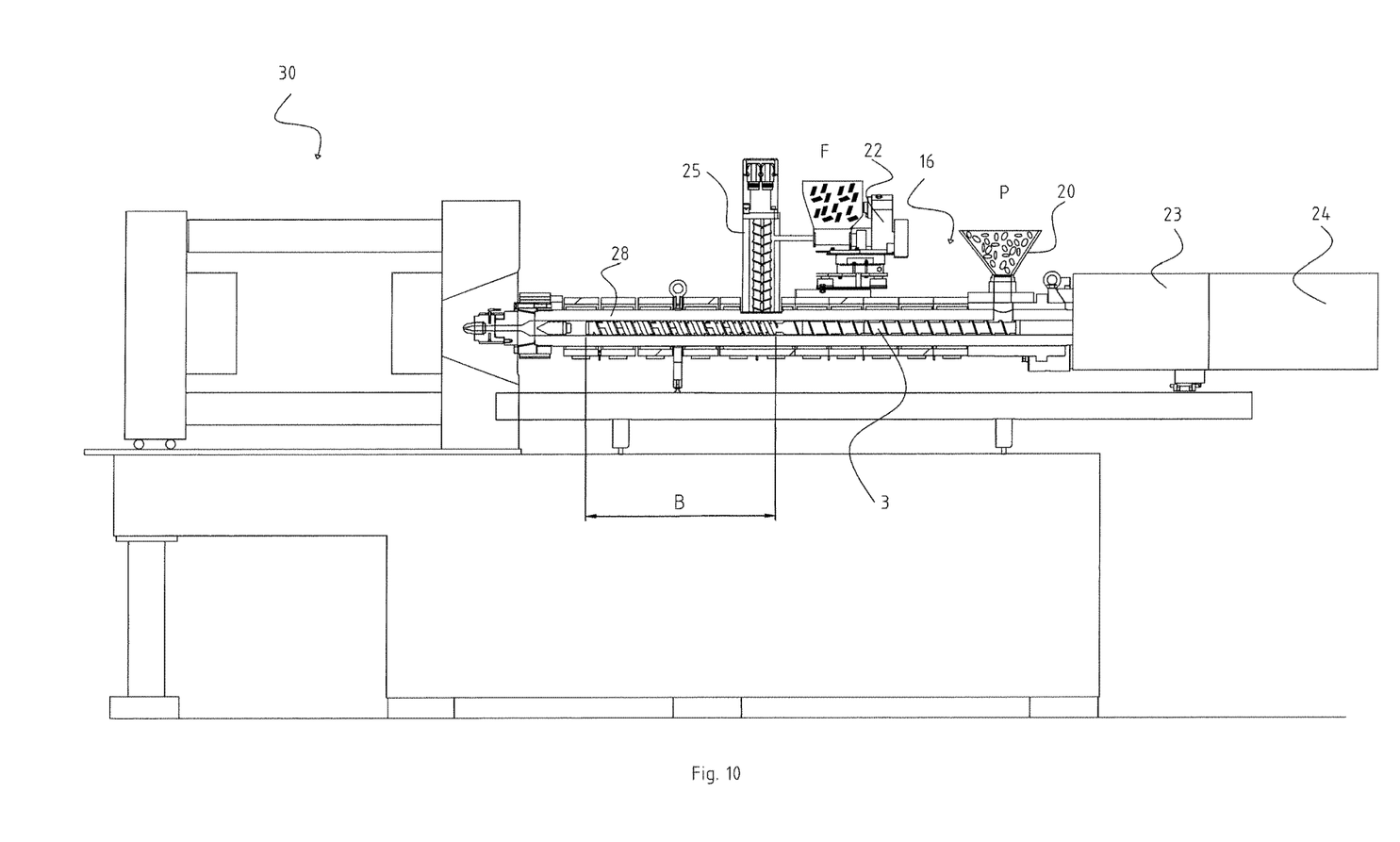

FIG. 10 shows an example embodiment of an injection moulding machine with a plasticizing- and injecting unit 16 and with a clamping unit 30, which are both supported on a machine bed 40. In contrast to the plasticizing- and injecting unit 15 of FIG. 9, here the plastic material P and the fibre material F are fed separately into the cylinder 2. The plastic material P is fed into the cylinder 2 via a first feeding hopper 20 at the rear end of the plasticizing- and injecting unit 16. Downstream, viewed in conveying direction of the melt, but before the start of the shearing section B, the fibre material F is fed into the cylinder 2. The fibre material F is delivered via a fibre material metering device 22 to a screw conveyor 25, which is flanged horizontally or vertically onto the cylinder 2.

Figure 11:
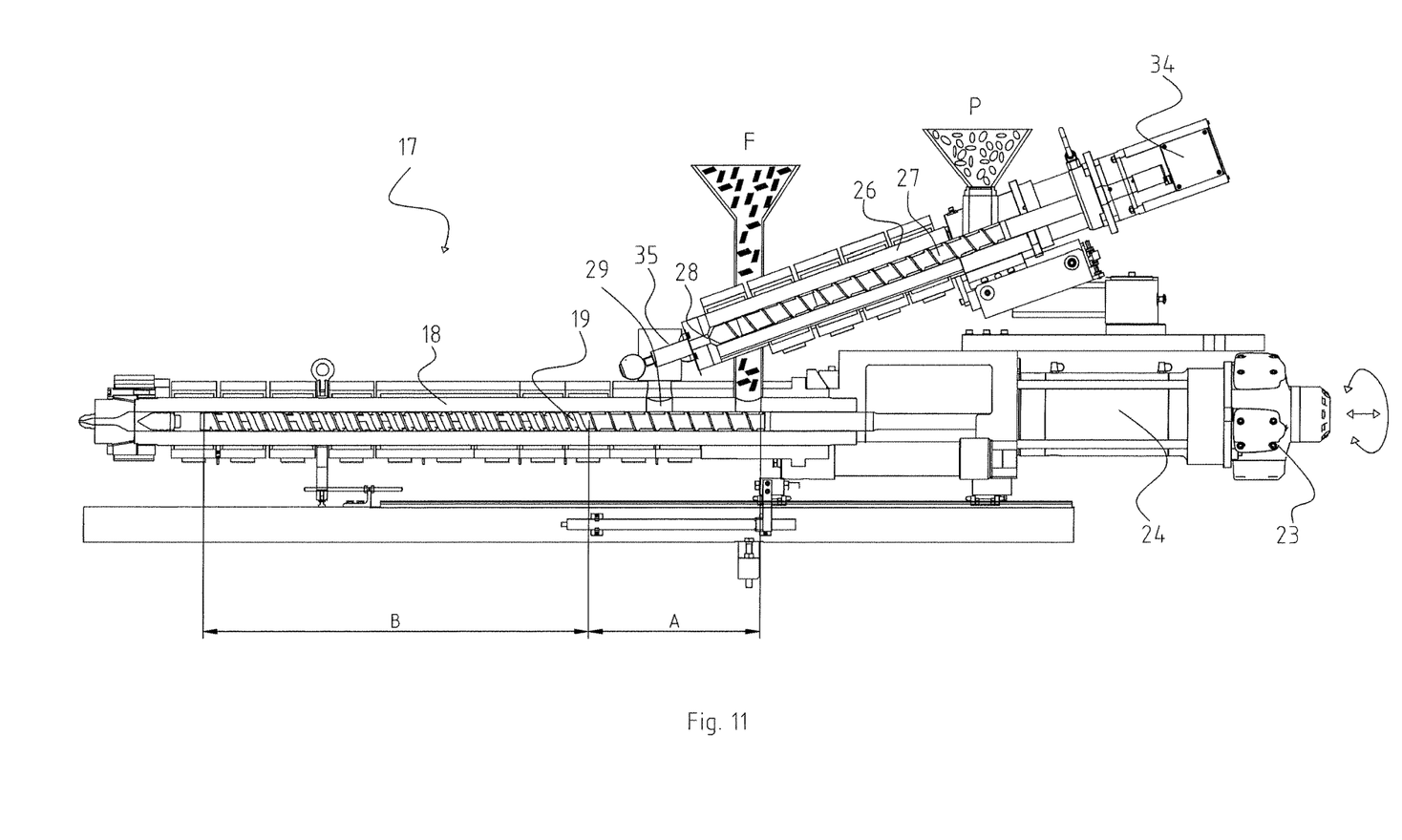

FIG. 11 shows a variant for a spatial separation for the addition of the plastic material P and the addition of the fibre material F. This structure enables the separation of the plasticizing process from the homogenizing process of the fibre material and thereby promotes the mechanical stressing of the latter. The plasticizing- and injecting unit 17 of the third type of construction, illustrated here, comprises a first cylinder 18 with a screw 19 and a second cylinder 26 with a second screw 27. The cylinder 18 contains the screw 19, formed with a shearing section B. The additional, second cylinder 26 has at its front end a melt outlet 28, which is in fluidic connection with a melt inlet 29 in the rear region of the first cylinder 18, for example via a pipeline 35. For the second screw 27, only a rotary drive 34 is provided. The first screw 19 can be in operative connection with a rotary drive 23 and with a linear drive 24, as described above, so that a rotary and a linear movement of the screw 19 are possible, as is illustrated by the arrows at the rear end of the screw 19. The second cylinder 26 is provided for the production of a melted plastic material (P), wherein the melted plastic material (P) is transferred from the second cylinder 26 into the first cylinder 18. At the first cylinder 18 an inlet is provided for the adding of fibre material (F), in particular for cut fibre granulate. The inlet for the melted plastic material (P) and the inlet for the fibre material (F) are arranged on the first cylinder 18, viewed in conveying direction of the melt, before the start of the shearing section B.

LIST OF REFERENCE NUMBERS 1 plasticizing unit
2 cylinder
3 screw
4 blocking web
5 main screw thread
6 shearing web
6a surface of the shearing web 6
7 first wave screw thread
8 second wave screw thread
9 wave peak in wave screw thread 7
9a start of the shearing surface of wave peak 9
9b end of the shearing surface of wave peak 9
9c surface of wave peak 9 (shearing surface)
10 wave peak in wave screw thread 8
10c surface of wave peak 10
11 wave trough in wave screw thread 7
12 wave trough in wave screw thread 8
13 ascending flank
14 descending flank
15 plasticizing and injecting unit of first type of construction
16 plasticizing and injecting unit of second type of construction
17 plasticizing and injecting unit of third type of construction
18 first cylinder of plasticizing and injecting unit 17
19 first screw of plasticizing and injecting unit 17
20 feeding hopper
21 plastic material metering device
22 fibre material metering device
23 rotary drive
24 linear drive
25 screw conveyor
26 second cylinder of plasticizing and injecting unit 17
27 second screw of plasticizing and injecting unit 17
28 melt outlet
29 melt inlet
30 clamping unit
31 fixed platen
32 movable platen
33a movable mould half
33b fixed mould half
34 rotary drive for second screw 27
35 pipeline
40 machine bed
A first screw section
B second screw section
C third screw section
P plastic material
F fibre material
$G_5$ thread width of main screw thread 5
$G_7$ thread width of wave screw thread 7
$G_8$ thread width of wave screw thread 8
$B_4$ web width of blocking web 4

$B_6$ web width of shearing web 6
Lw length of the plateau of a wave peak 9, 10
SF shearing surface
SFs shearing surface of shearing web 6
SFw shearing surface of a wave peak 9, 10
$SFw_7$ shearing surface of a wave peak in wave screw thread 7
$SFw_8$ shearing surface of a wave peak in wave screw thread 8
$S_{Z1}$ shearing surface shearing gap
$S_{Z2}$ wave peak shearing gap
SP gap between blocking web and cylinder inner wall
SZ gap between shearing surface and cylinder inner wall
α angle between ascending flank and surface of the shearing web
β angle between descending flank and surface of the shearing web

The invention claimed is:

1. A plasticizing unit (1) for an injection moulding machine or an extrusion system, wherein the plasticizing unit (1) comprises:
a cylinder (2) and a screw (3) arranged rotatably therein, wherein the screw (3) has a screw section formed as a shearing section (B),
wherein in the shearing section (B) the screw (3) has a blocking web (4) encircling the screw in a helical manner, and
a main screw thread (5) enclosed by the blocking web (4),
wherein in the main screw thread (5) a shearing web (6) is arranged parallel to the blocking web (4),
wherein the shearing web (6) has at least a part with a smaller height than a height of the blocking web (4) and at this part a surface (6a) of the shearing web (6) forms a shearing web shearing surface ($SF_S$),
wherein in the main screw thread (5) a first wave screw thread (7) and a second wave screw thread (8) are provided, each running parallel and spaced apart from one another by the shearing web (6),
wherein the first wave screw thread (7) has a first thread base (15), running in a wave-shaped manner in a conveying direction of a melt, and the second wave screw thread (8) has a second thread base (16) running in a wave-shaped manner in the conveying direction of the melt,
wherein wave peaks (9) of the first wave screw thread (7), when viewed in the conveying direction of the melt, lie offset with respect to wave peaks (10) of the second wave screw thread (8),
wherein the wave peaks (9) of the first wave screw thread (7) and the wave peaks (10) of the second wave screw thread (8) are each provided with a surface (9c, 10c) configured as a plateau forming a wave peak shearing surface ($SF_W$),
wherein a length ($L_W$) of the wave peak shearing surface ($SF_W$), when viewed in the conveying direction of the melt, is longer than a width ($B_4$) of the blocking web (4), and/or a width ($B_6$) of the shearing web (6) is wider than the width ($B_4$) of the blocking web (4) at the shearing web shearing surface ($SF_S$),
wherein the wave peak shearing surface ($SF_W$) is situated at a same height as a height of the surface (6a) of the shearing web (6),
wherein the wave peak shearing surface ($SF_W$) and the shearing web shearing surface ($SF_S$) together form an overall shearing surface (SFn),
wherein the overall shearing surface (SFn) forms with an inner wall of the cylinder (2) a shearing surface shearing gap ($S_{Z1}$), and
wherein in both the first wave screw thread (7) and the second wave screw thread (8) more than one overall shearing surface (SFn) is present, and a size of the shearing surface shearing gap ($S_{Z1}$) becomes smaller in the conveying direction of the melt.

2. The plasticizing unit according to claim 1, wherein with respect to a screw diameter D, the length ($L_W$) of the wave peak shearing surface ($SF_W$), viewed in the conveying direction of the melt, has a dimension of at least 0.15×D, and/or that the width ($B_6$) of the shearing web (6) has at least in part a dimension of at least 0.15×D, wherein the width ($B_6$) of the shearing web (6) has this dimension at the shearing web shearing surface ($SF_S$).

3. The plasticizing unit according to claim 2, wherein the length ($L_W$) of the wave peak shearing surface ($SF_W$) is greater than or equal to 0.20×D.

4. The plasticizing unit according to claim 3, wherein the length ($L_W$) of the wave peak shearing surface ($SF_W$) is greater than or equal to 0.30×D.

5. The plasticizing unit according to claim 2, wherein the width ($B_6$) of the shearing web (6) is greater than or equal to 0.20×D.

6. The plasticizing unit according to claim 5, wherein the width ($B_6$) of the shearing web (6) is greater than or equal to 0.30×D.

7. The plasticizing unit according to claim 1,
wherein the size of the shearing web shearing gap ($S_{Z1}$) at the shearing web shearing surface ($SF_S$) has a value between 0.2 mm and 2.0 mm.

8. The plasticizing unit according to claim 7, wherein the size of the shearing web shearing gap ($S_{Z1}$) has a value between 0.3 mm and 0.9 mm.

9. The plasticizing unit according to claim 8, wherein the size of the shearing web shearing gap ($S_{Z1}$) has a value between 0.4 mm and 0.8 mm.

10. The plasticizing unit according to claim 1,
wherein the surface (6a) of the shearing web (6), viewed in the conveying direction of the melt, has a profile, wherein the profile is step-shaped or wave-shaped, wherein the profile is configured such that the surface (6a) of the shearing web (6) near the wave peaks (9, 10) lies lower than in other regions, and that near a wave trough the surface (6a) of the shearing web (6) lies at a same height as a surface of the blocking web (4).

11. The plasticizing unit according to claim 1,
wherein the surface (9c, 10c) of the wave peaks (9, 10) form with the inner wall of the cylinder (2) a wave peak shearing gap ($S_{Z2}$),
wherein a size of the wave peak shearing gap ($S_{Z2}$) becomes smaller in the conveying direction of the melt.

12. The plasticizing unit according to claim 1,
wherein in region of the overall shearing surface (SFn), the width ($B_6$) of the shearing web (6) at its surface (6a) is smaller than or equal in size to the length ($L_W$) of the wave peak shearing surface ($SF_W$), viewed in the conveying direction of the melt, wherein the width ($B_6$) has a lower threshold value of between 50% and 60% and an upper threshold value of between 80% and 90% of the length ($L_W$).

13. The plasticizing unit according to claim 1,
wherein the wave peak shearing surface ($SFW_7$) of the first wave screw thread (7) and the wave peak shearing surface ($SFW_8$) of the second wave screw thread (8), viewed in the conveying direction of the melt, are spaced apart from one another, wherein the wave peak shearing surface ($SF_W$) in the first wave screw thread (7) is associated with a wave trough (12) in the second wave screw thread (8).

14. The plasticizing unit according to claim 1,
wherein the wave peaks (9, 10), viewed in the conveying direction of the melt, have an ascending flank (13) lying in front of the wave peak shearing surface ($SF_W$), and a descending flank (14) lying after the wave peak shearing surface ($SF_W$), wherein the ascending flank (13) forms a first angle ($\alpha$) with the surface (6a) of the shearing web (6), wherein the descending flank (14) forms a second angle ($\beta$) with the surface (6a) of the shearing web (6), and wherein the first angle ($\alpha$) is smaller than the second angle ($\beta$).

15. The plasticizing unit according to claim 1,
wherein the cylinder (2) with the screw (3) formed with the shearing portion (B) constitutes a first cylinder (18) with a first screw (19), wherein addition to the first cylinder (18) a second cylinder (26) is provided with a second screw (27), wherein the second cylinder (26) has at its front end a melt outlet (28), which is in fluidic connection with a melt inlet (29) in the rear region of the first cylinder (18), wherein the second cylinder (26) is provided for the production of a melted plastic material (P), wherein the melted plastic material (P) can be transferred from the second cylinder (26) into the first cylinder (18), wherein at the first cylinder (18) an inlet is provided for the addition of a fibre material (F), and wherein at the first cylinder (18) the inlet for the plastic material (P) and the inlet for the filler, when viewed in the conveying direction of the melt, are arranged in front of the shearing portion (B).

* * * * *